United States Patent [19]
van Rosberg

[11] 4,453,285
[45] Jun. 12, 1984

[54] RINSING BRUSH WITH SUCTION BASE

[76] Inventor: Victor J. van Rosberg, 173 Margÿnenenk, 7415 JV Deventer, Netherlands

[21] Appl. No.: 461,112

[22] Filed: Jan. 25, 1983

[51] Int. Cl.³ .............................................. A46B 15/00
[52] U.S. Cl. .................................... 15/164; 248/205.8
[58] Field of Search .................. 15/164, 165, 71, 211; 248/206 R, 362, 363, 205.8, 205.9, 206.1, 206.2, 206.3, 206.4; 279/3; 294/64 R; 51/235

[56] References Cited

U.S. PATENT DOCUMENTS 355,021 12/1886 Lang .............................. 294/64 R X
2,556,003 6/1951 Sandell et al. ...................... 15/211 X

FOREIGN PATENT DOCUMENTS 1915483 7/1970 Fed. Rep. of Germany ... 248/205.8

Primary Examiner—Peter Feldman
Attorney, Agent, or Firm—D. Paul Weaver

[57] ABSTRACT

A rinsing brush for deep glassware is mounted on a rigid arm which is pivotally attached to a connecting element, in turn attached to a suction cup. A relatively rigid reaction cup is interposed between the suction cup and the pivoted rigid arm, whereby when the arm is swung to an upright use position, the rigid cup is depressed to clamp the margin of the suction cup while the latter is stretched upwardly by the connecting element. A locking sleeve above the rigid cup holds the brush on in the upright use position.

7 Claims, 4 Drawing Figures

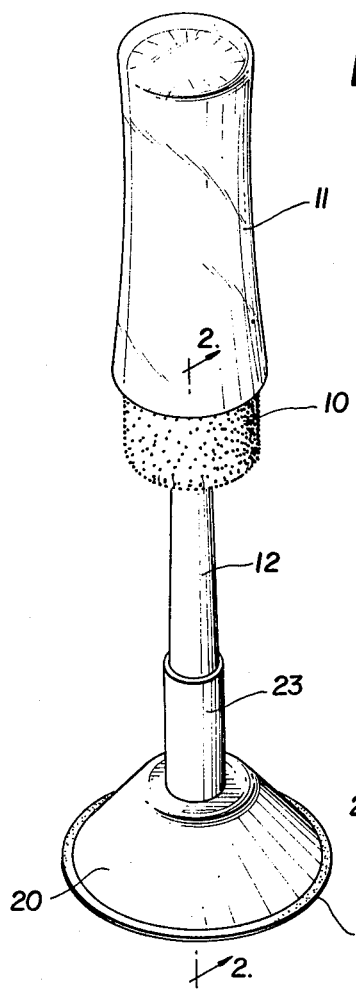
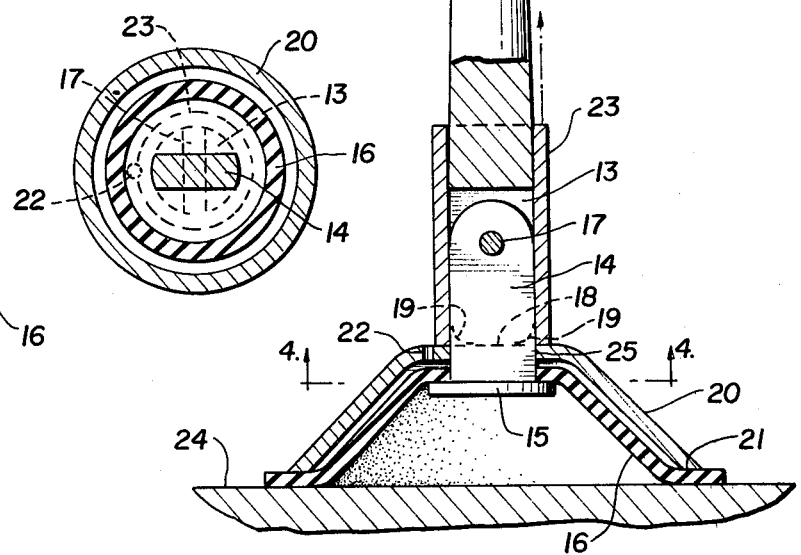
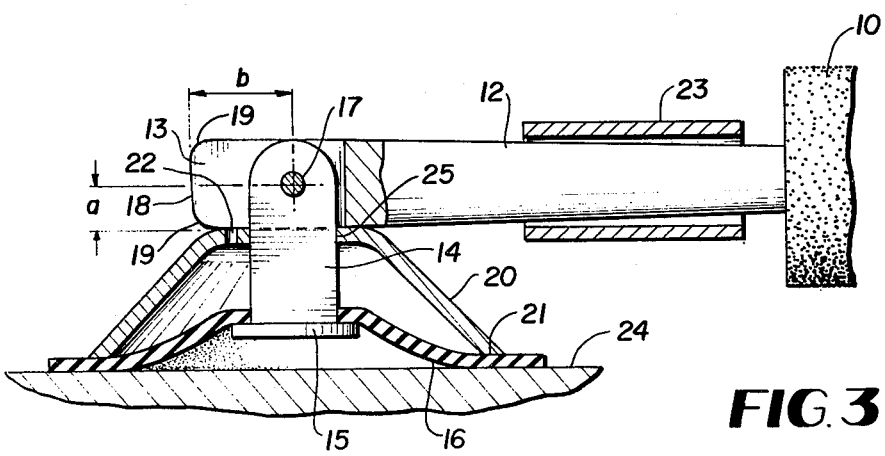

RINSING BRUSH WITH SUCTION BASE

BACKGROUND OF THE INVENTION

The invention relates to a cleaning brush for glassware designed primarily for daily household usage. It is also useful to caterers, bartenders, and the like who must continuously clean and rinse large numbers of glasses.

Customarily, an upstanding cylindrical scrubbing brush is customarily positioned near the washing and rinsing sink and deep slender glasses are engaged over the cylindrical brush for cleaning their interiors prior to being rinsed in the sink. It is known to attach such brushes to an adjacent drain board surface by means of a suction cup. The ability of conventional suction cups to grip the supporting surface effectively is not always up to the standards required for efficient use of the brush over a long period of time, and the user is compelled to repeatedly reengage the suction cup against the holding surface when the suction or vacuum fails.

Accordingly, it is the objective of this invention to provide an improved glassware cleansing brush of the above-identified type in which a suction cup base is provided having a much greater holding force which will reliably anchor the brush to a supporting surface over a long period of time without loss of suction, thus enabling the bartender or caterer to cleanse a multitude of glasses without interruption to remount the cleansing brush as when the vacuum within the suction cup fails.

Another object of the invention is to provide a device of the above-mentioned character which is durable, simplified in construction and operation, highly convenient and inexpensive to manufacture.

Other features and advantages of the invention will become apparent to those skilled in the art during the course of the following description.

BRIEF DESCRIPTION OF DRAWINGS

FIG. 1 is a perspective view of a glassware cleaning brush in use.

FIG. 2 is an enlarged longitudinal vertical section taken on line 2—2 of FIG. 1.

FIG. 3 is a view similar to FIG. 2 showing the brush in a folded, non-use position.

FIG. 4 is a horizontal section taken on line 4—4 of FIG. 2.

DETAILED DESCRIPTION

Referring to the drawings in detail wherein like numerals designate like parts, the numeral 10 designates a cylindrical glassware cleaning brush particularly for deep, slender glasses of the type indicated at 11 in FIG. 1. When a bartender or caterer inverts the glass 11 and forces it over the cylindrical brush 10, the interior of the glass down to its bottom wall can be thoroughly cleaned by the brush.

The brush 10 is attached to a rigid arm or shaft 12 whose lower end 13 is bifurcated to straddle a rigid connector element 14 having a lower end enlarged head 15 fixed centrally to an elastic suction cup 16.

The bifurcated end portion 13 of the arm 12 is pivotally attached to the connector element 14 near the top of the latter by a pivot pin 17. The axis of the pivot pin 17 is spaced a distance b from the lower end 18 of the bifurcated portion 13 and is spaced a smaller distance a from each side of the bifurcated portion 13, about one half of the distance b. Preferably the leading corners 19 of the bifurcated portion 13 are rounded, as shown in the drawings.

A relatively rigid reaction cup 20 is movably mounted on the connector element 14 and can be displaced longitudinally of this element at proper times. The rigid cup 20 overlies the flexible cup 16 and has a forward annular end face 21 cut on an angle to bear against the top surface of the suction cup 16. The rigid cup 20 has a vent opening 22 in its top wall outwardly of the connector element 14 through which air trapped in the space between the two cups can escape.

A locking sleeve 23 loosely surrounds the rigid arm 12 and can be shifted toward the brush 10 and away from connector element 14 to allow swinging of the arm and brush 10 to a down non-use position shown in FIG. 3. In the upright use position shown in FIGS. 1 and 2, the locking sleeve 23 engages over the rigid connector element 14 and a bifurcated portion 13 to lock the brush in the normal use position.

During periods of non-use with the arm 12 in the down position, the brush can be placed aside at any convenient location. When its use is required, the elastic suction cup 16 is placed so that its marginal portion engages a flat support surface 24, such as a counter top or drain board surface. The arm 12 is then forcibly swung on the axis of pivot element 17 to the upright position. When this occurs, one of the rounded shoulders 19 of bifurcated portion 13 will cammingly act on the top of rigid cup 20 forcing its lower edge 21 into firm clamping engagement with the suction cup 16. Simultaneously, the rigid connector element 14 will be pulled upwardly through the aperture 25 of the rigid cup 20 and the elastic suction cup 16 is correspondingly stretched upwardly within the rigid cup 20 by the enlarged head 15, the cup 20 remaining stationary relative to the suction cup during this stretching action. As a consequence, a strong and effective partial vacuum is developed under the suction cup 16 which will be maintained for a long period of time to render the cleansing brush usable for cleaning glassware on a continuous basis until the arm 12 is again swung downwardly to a position at right angles to the axis of the connector element 14 and suction cup. This will break the vacuum under the suction cup so that the device may be placed aside.

In the swinging of the arm 12 to the upright position, the greater distance speed measured from the axis of pivot element 17 is taken advantage of to displace the connector element 14 axially a sufficient distance to stretch the cup 16. When the arm 12 is down, FIG. 3, the smaller distance a is utilized to relax the suction cup and destroy its vacuum.

It is to be understood that the form of the invention herewith shown and described is to be taken as a preferred example of the same, and that various changes in the shape, size and arrangement of parts may be resorted to, without departing from the spirit of the invention or the scope of the subjoined claims.

I claim:

1. A glassware cleaning brush comprising a brush body portion having an arm extending from one end thereof, a connector element pivotally connected with the arm at a point spaced from the end of the arm remote from the brush body portion, an elastic suction cup secured to said connector element, a substantially rigid reaction cup movably held on the connector element between said suction cup and the pivot axis of said arm and having a top wall which is cammingly engaged by the end of the arm remote from the brush body portion when the arm is swung on its pivot to a position coaxial with the connector element to thereby depress the rigid reaction cup into clamping engagement with the marginal portion of the suction cup while simultaneously the suction cup is stretched away from an engaging surface.

2. A glassware cleaning brush defined in claim 1 and a locking sleeve movably mounted on said arm and shiftable to a position across the pivot axis of the arm to lock the arm and brush body portion in a position of use while the suction cup is stretched and evacuated.

3. A glassware cleaning brush as defined in claim 2 and the arm being bifurcated at its end remote from the brush body portion and straddling said connector element in the region of the pivotal connection of the arm with the connector element.

4. A glassware cleaning brush as defined in claim 1 and said connector element having an enlarged head which engages beneath the wall of the suction cup to enable stretching of the suction cup when the connector element is displaced is one direction.

5. A glassware cleaning brush as defined in claim 1 and the pivot axis of said arm with the connector element being a substantially greater distance from the end of the arm remote from the brush body portion than from the opposite sides of the arm.

6. A glassware cleaning brush as defined in claim 5 and said end of the arm having a flat surface and rounded shoulders at opposite ends of the flat surface to enable camming engagement with the reaction cup.

7. A glassware cleaning brush comprising a brush body of a size and shape to enter slender deep glassware, a substantially rigid arm carrying the brush body portion, a substantially rigid connector element pivotally attached to the arm near the end of the arm remote from the brush body portion, an elastic suction cup attached to the connector element near its end remote from the pivotal connection of the connector element to the arm, a substantially rigid vented cup overlying the suction cup and surrounding the connector element and being movable longitudinally thereon, the rigid cup having an annular end face adapted to clampingly engage a marginal portion of the suction cup, and a locking sleeve movably mounted on the arm and adapted to be positioned over the connector element and the adjacent portion of the arm and across the pivot axis of the arm to lock the arm in coaxial relationship with the connector element.

* * * * *